May 8, 1962   J. H. WILSON   3,033,528
COMBINATION VEHICLE AND DRILLING RIG DRIVE
Filed Jan. 13, 1959   4 Sheets-Sheet 1
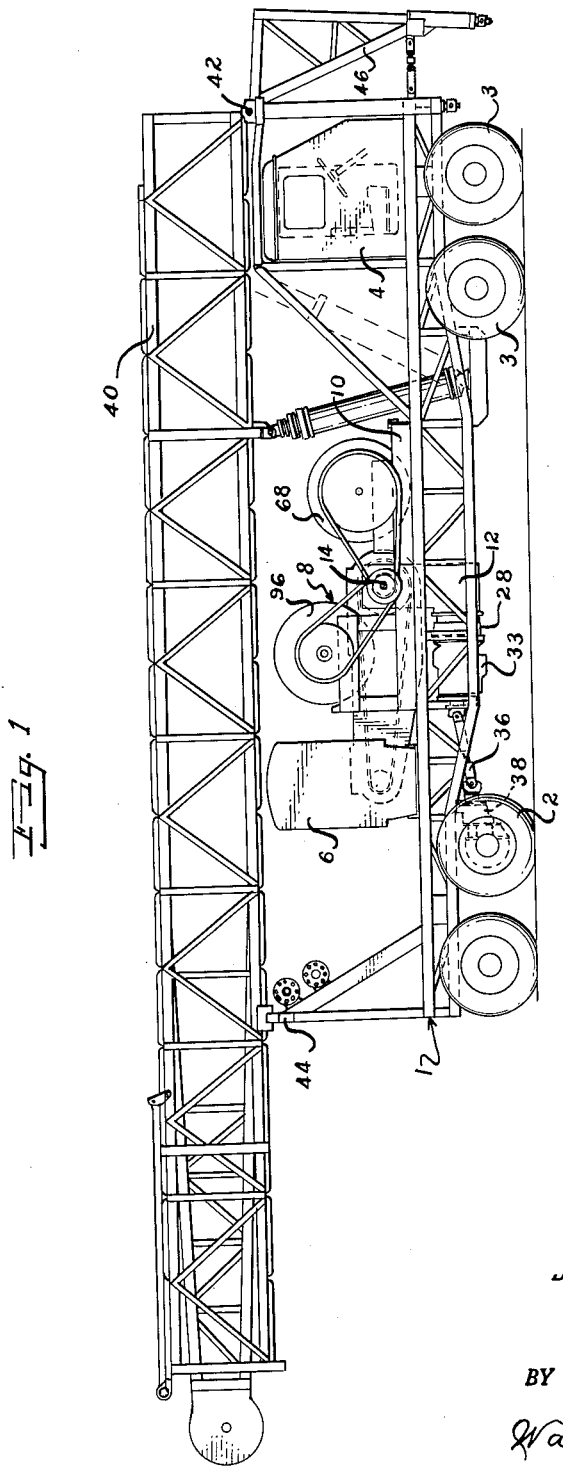
JOHN HART WILSON
INVENTOR.
BY
Wayland D. Keith
HIS AGENT

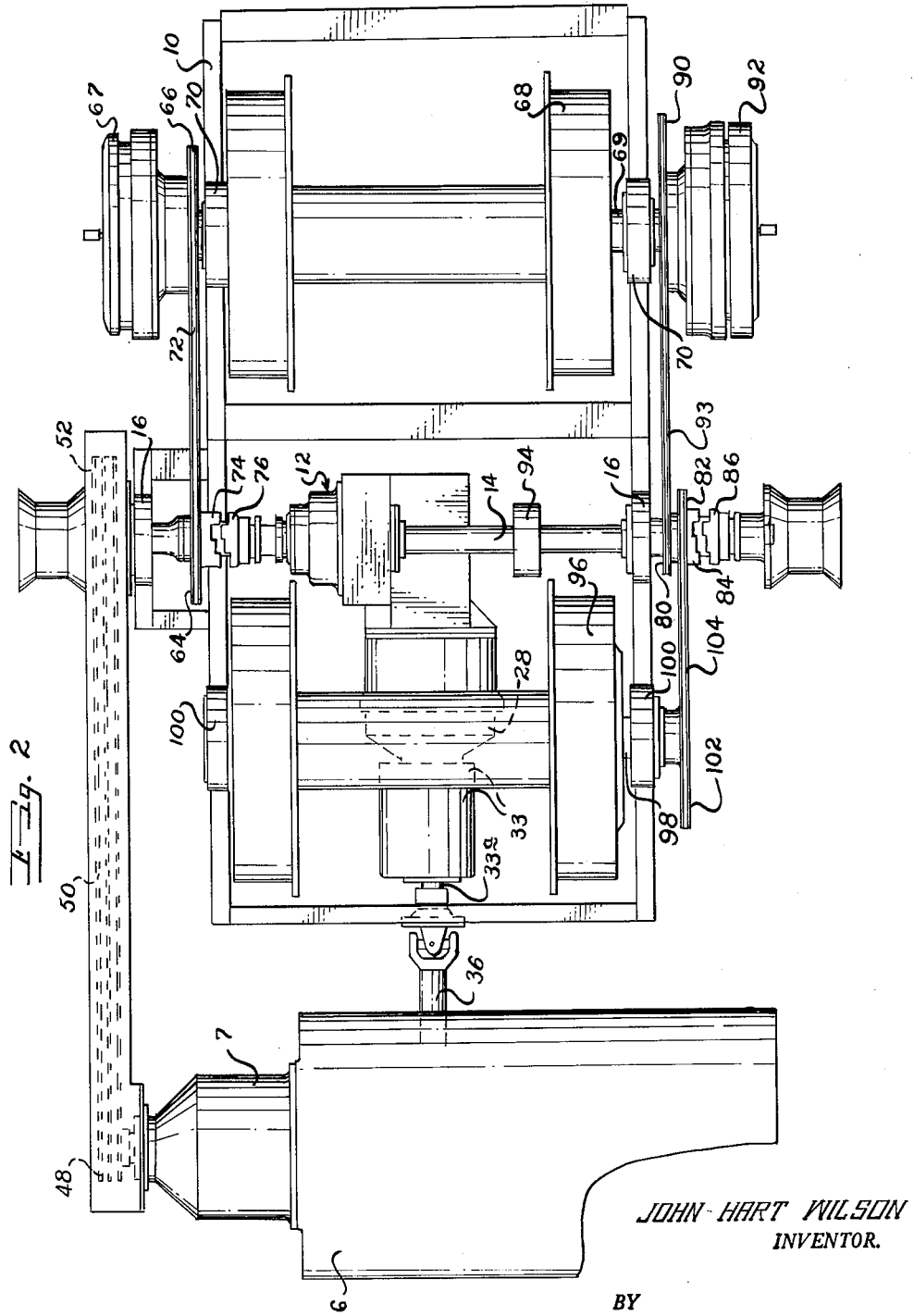

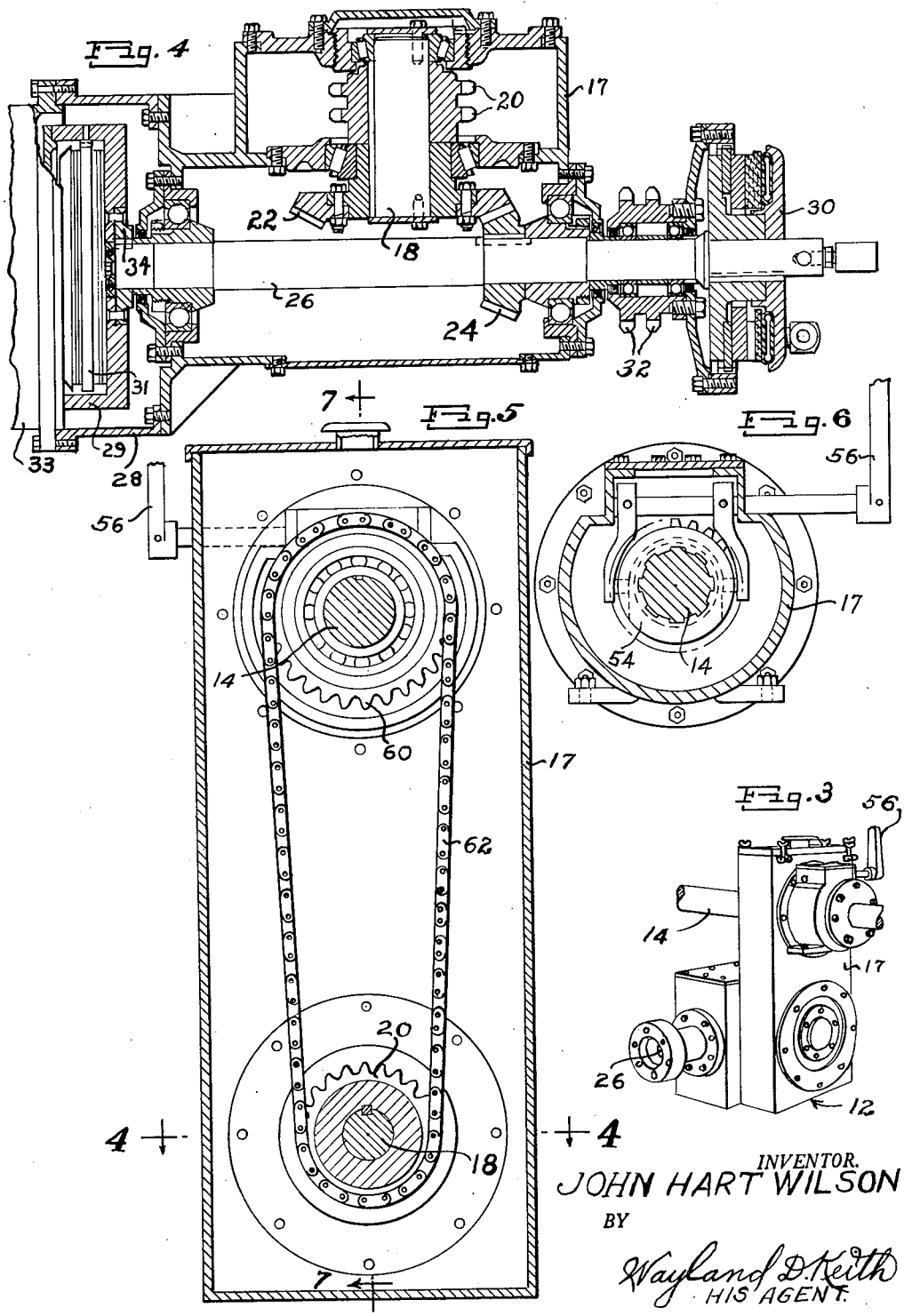

May 8, 1962 J. H. WILSON 3,033,528
COMBINATION VEHICLE AND DRILLING RIG DRIVE
Filed Jan. 13, 1959 4 Sheets-Sheet 4
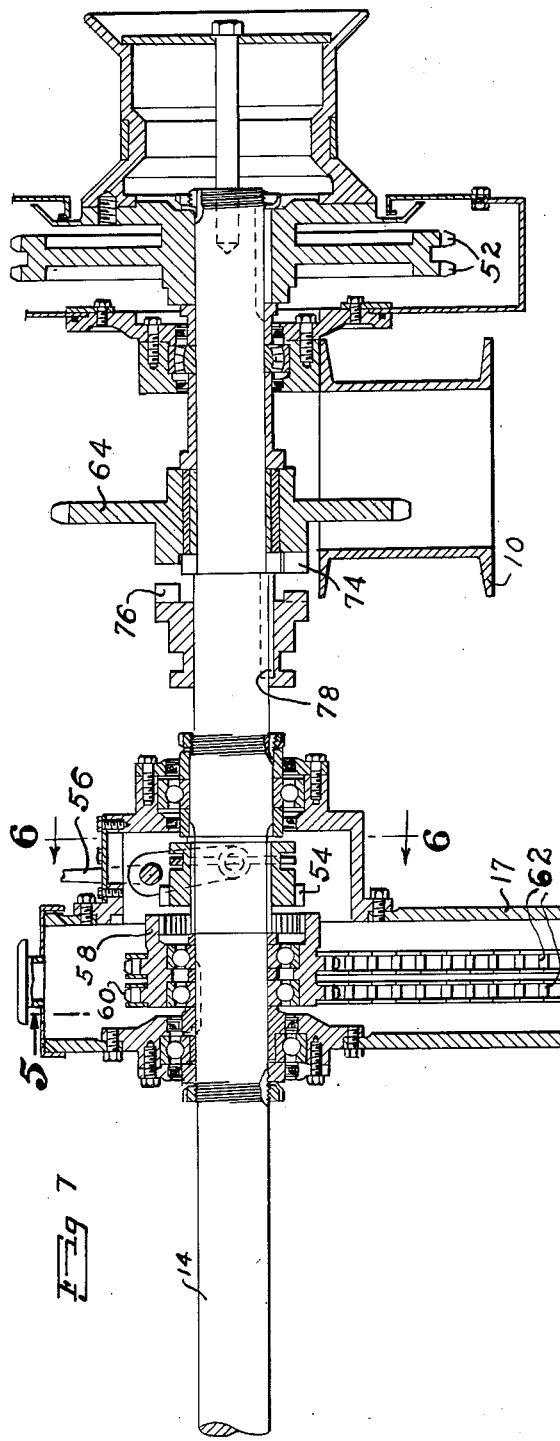
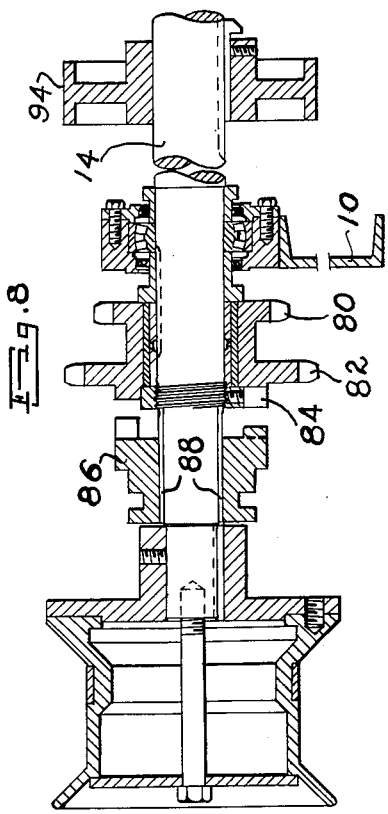
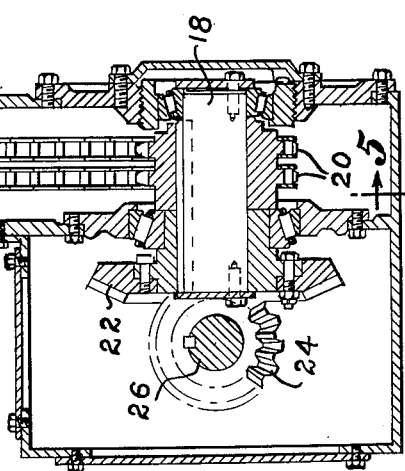
INVENTOR.
JOHN HART WILSON
BY
Wayland D. Keith
HIS AGENT.

United States Patent Office 3,033,528
Patented May 8, 1962

3,033,528
COMBINATION VEHICLE AND DRILLING RIG DRIVE
John Hart Wilson, P.O. Box 1031, Wichita Falls, Tex.
Filed Jan. 13, 1959, Ser. No. 786,578
3 Claims. (Cl. 254—166)

This invention relates to improvements in vehicle drives, and more particularly to a combination vehicle drive and well drilling and servicing rig drive unit.

This application is co-pending with application Ser. No. 520,233, for Combination Vehicle and Drilling Rig Frame, filed July 6, 1955, now Patent No. 2,948,511, but the present application has certain features incorporated thereinto which makes for greater ease in construction, quicker assembly and disassembly, and provides a more simple mechanism than has heretofore been used.

Heretofore, combination well drilling and servicing rigs and vehicles had the engine mounted longitudinally of the vehicle frame, with the engine driving through a torque converter, a universal shaft assembly, and a multiple speed transmission assembly, thence through another universal shaft assembly to a bevel gear unit, by which the power is turned at a right angle, then by means of a chain drive, to one drum shaft, thence by a second chain drive to the main drum shaft, through all of which driving elements, there occurs a power loss of about 25% of the power output at the convertor.

In the present drive system, which employs only two chain drives between the torque convertor and the main drum, the power loss is only about 10%, which means that 20% more power is available, with the same horsepower, at the drum, with the present system than with the conventional drive as described above.

An object of this invention is to provide a combination vehicle and well drilling and servicing rig drive which is so unitized that it may be set into a vehicle frame and removed therefrom as a unit.

Another object of the invention is to provide a combination vehicle drive and drilling and well servicing rig drive, wherein a drilling rig engine can be mounted transversely of the vehicle frame, which engine may be selectively used to power the vehicle, when moving the drilling rig from place to place, and which will power the drilling and servicing rig, when the rig is on a well location.

Still another object of the invention is to provide a combination vehicle and well drilling and servicing rig drive, which will drive from a source of power above the frame, to a wheel drive mechanism below the frame, and which will enable the drilling rig to be driven from a power unit, through the drive unit above the vehicle frame.

A further object of the invention is to provide a drive of high efficiency, which has a minimum of operating elements in the driving system, which minimizes wear on the parts, therefore the replacement thereof.

With these objects in mind and others which will become manifest as the description proceeds, reference is to be had to the accompanying drawings, in which like reference characters designate like parts in the several views thereof, in which:

FIG. 1 is a side elevational view of a mobile drilling rig on which the draw works and mast thereof are mounted;

FIG. 2 is an enlarged top plan view of the drilling rig unit removed from the vehicle frame, and showing the vehicle drive unit mounted thereon;

FIG. 3 is a perspective view of the drive unit removed from the vehicle frame and showing portions of the transverse counter-shaft broken away;

FIG. 4 is a sectional view taken on the line 4—4 of FIG. 5, looking in the direction indicated by the arrows;

FIG. 5 is a sectional view taken on the line 5—5 of FIG. 7, looking in the direction indicated by the arrows;

FIG. 6 is a sectional view taken on the line 6—6 of FIG. 7, looking in the direction indicated by the arrows;

FIG. 7 is a fragmentary sectional view taken on the line 7—7 of FIG. 5, looking in the direction indicated by the arrows, with parts broken away to show the details of construction; and FIG. 8 is a fragmentary, longitudinal sectional view which is an extended portion of FIG. 7.

With more detailed reference to the drawings, the numeral 1 designates generally a frame on which power drive wheels 2 and steerable wheels 3 are mounted. The frame 1 is of trussed construction and is of the same general character as the frame described in the above mentioned application, however, the device, which is the subject matter of the present application, has a frame of the same horizontal width throughout the length thereof. A control cab 4, to house the operator while the vehicle is being driven over the highway, is provided at the forward end of the vehicle frame.

A prime mover, such as an internal combustion engine 6, is mounted transversely of the frame 1. A draw-works unit, designated generally at 8, is mounted on the upper face of frame 1 on rig frame members 10. A drive unit 12 is mounted between rig frame members 10 and is supported thereon, which drive unit has a transverse counter shaft 14 passing therethrough and which is journaled in bearings 16 mounted on rig frame members 10. A housing 17 is provided for the drive unit 12 and has a portion thereof extending downward. A shaft 18 is journaled in the housing 17 and has sprockets 20 fixedly secured thereto. The shaft 18 extends outward from the housing 17 and has a bevel gear 22 thereon, which bevel gear is in mesh with a pinion gear 24 which is mounted on transmission shaft 26. The transmission shaft 26 has one end which extends into casing 28 and has a coupling unit 34 thereon, the other end of which transmission shaft extends outward and has an air actuated clutch 30 thereon. An auxiliary drive sprocket 32 is mounted on clutch 30 so that the sprocket 32 may be selectively driven to drive an auxiliary unit, such as a pump, rotary table, or the like.

The coupling unit 34, on the opposite end of the transmission shaft 26 may be connected to a torque converter or such transmission unit as desired. A universal shaft 36 extends outward from the transmission casing 28, which universal shaft connects with a power driven differential 38, in a manner well known in the art of vehicle drives. While only one pair of wheels is shown to be driven by differential 38, it is to be understood that the connection of the vehicle wheels in tandem is a well known expedient.

A mast 40 is shown to be hingeably mounted on transverse shaft 42 at the forward end of the vehicle frame 1 and extends throughout the length thereof and is supported on racks 44 at the rear end of the frame 1. A lower mast section 46 is pivotally mounted on shaft 42 and is pivotally adjustable thereon to adjust the angularity of the erected mast.

The engine unit 6 has a sprocket drive 48 thereon which drives transmission chain 50, which chain passes around drive sprocket 52 on counter-shaft 14, which sprocket is fixedly secured thereto. A jaw clutch 54 is keyed or splined to shaft 14, as will best be seen in FIGS. 6 and 7. A clutch operating lever 56 is provided to enable the sliding of the clutch 54 into and out of engagement with a companion clutch member 58 which is journaled on shaft 14. The companion clutch member 58 carries sprockets 60 thereon, around which a transmission chain or chains 62 pass. The chains 62 pass downward through housing 17 and are in driving engagement with sprockets 20 on shaft 18. A sprocket 64 is journaled on shaft 14 and is in driving alignment with sprocket 66 which is mounted on a shaft of hoisting drum 68, which hoisting drum is journaled on bearings 70 which are mounted on rig frame members 10. A transmission chain 72 surrounds sprockets 64 and 66 to connect these sprockets in driving relation. The sprocket 66 is mounted on an air clutch 67, which is mounted on drum shaft 69, to enable the hoist drum 68 to be selectively rotated.

The sprocket 64 has a positive clutch portion 74 thereon, which may be selectively engaged with a sliding clutch 76, which is keyed to shaft 14 by means of a key 78, so as to connect shaft 14 in driving relation therewith. Further sprockets 80 and 82 are journaled on shaft 14, which sprockets have a positive clutch portion 84 made integral therewith, which clutch portion 84 is adapted to complementally engage a slidable clutch portion 86, which is mounted on a splined portion 88 of shaft 14, to rotate the slidable clutch portion 86 with the shaft 14. A low speed drive sprocket 90 is mounted on air clutch 92 in aligned driving relation therewith. A transmission chain 93 surrounds sprocket 80 and sprocket 90 to connect the sprockets in driving relation.

The clutch 92 is mounted on drum shaft 69 to enable the selective rotation of hoisting drum 68 in low speed.

A brake drum 94 is keyed to shaft 14 to enable the braking of the shaft in a manner well understood in the art of brakes.

A second hoisting drum 96 is mounted on drum shaft 98, which drum shaft is mounted on bearings 100, which bearings 100 are mounted on rig frame members 10. A sprocket 102 is mounted on the outer end of drum shaft 98 and has a chain 104 passing therearound and around sprocket 82, so as to connect hoisting drum 96 in driving relation with shaft 14, when the clutch 86 is engaged.

The vehicle drive unit, as disclosed in the present application, distinguishes from the Power Take-off for Trucks, as disclosed in Patent No. 2,766,628, issued October 16, 1956, to John Hart Wilson, by the utilization of a transversely arranged engine 6 for driving through the counter-shaft 14, thence down through chain and sprocket arrangement 62, 60 and 20, in such manner as to take the power from the engine down through housing 17 and thence through bevel gear unit 22—24 mounted on the respective shafts 18 and 26, so as to drive through a universal shaft 36 and differential 38 to drive the wheels 2, whereas with the power take-off unit disclosed in the above mentioned patent, it is necessary to have the engine driving through a drive shaft which necessitated the splitting of the drive shaft by a clutch mechanism in order to selectively drive the wheels of the vehicle or the power out-put shaft of the power take-off, and since vehicles have drive shafts which are designed for road duty, these are usually small, whereas drilling rig engines are heavy, powerful engines, which have large shafts and large counter-shafts, therefore, with the present arrangement, the great amount of power required to drive the draw-works of the drilling rig may be carried through on large shafts, and the drive to the vehicle can be made secondary, since the power to drive the vehicle at normal road speeds is not as great as that required for driving drilling rig hoisting drums.

It is to be pointed out that the various component parts necessary for performing the functions of raising a mast may be provided by the transmission chains being connected in driving relation with sprocket 32, which may be selectively engaged by air clutch 30. The mechanism for shifting the various positive drive clutches, such as clutches 76 and 86, has not been shown, however, it is to be understood that conventional shift means may be employed in substantially the same manner as shown in FIGS. 6 and 7 for shifting clutch 54.

The various mechanisms are shown to be mounted on anti-friction bearings and sleeve bearings, which bearings are sealed, where necessary, with conventional seals.

The casing 28 has a fly wheel 29 therein, in which a conventional friction clutch 31 is operatively mounted in a manner well understood in the art of automotive vehicles.

The clutch 31 is connected to a transmission shaft 33a, in transmission-torque converter housing 33, which is of conventional design.

While no controls have been shown for operating the clutches 31, 67 and 92, it is to be understood that conventional controls may be employed.

While the invention has been illustrated and described in some detail herein, it is to be understood that changes may be made in the minor details of construction and adaptations made to different installations, without departing from the spirit of the invention or the scope of the appended claims.

Having thus clearly shown and described the invention, what is claimed as new and desired to secure by Letters Patent is:

1. A mobile well drilling and servicing rig comprising; an elongated vehicle frame, drive wheels mounted near one end of said elongated vehicle frame for supporting an end of said frame, a differential gear unit connected in driving relation with said drive wheels, a drive shaft extending outward from said differential gear unit, steerable wheels mounted on the opposite end of said vehicle frame and supporting said end of said frame, an engine mounted on the upper face of said elongated vehicle frame transversely thereof, a power output shaft extending outward from one end of said engine transversely of said frame, a hoisting drum frame mounted on and secured to the upper face of said vehicle frame a spaced distance from said engine, hoisting drums mounted on said hoisting drum frame, which hoisting drums are journaled on said hoisting drum frame for turning movement, a gear drive mechanism mounted on one of said frames and extending upward into said hoisting drum frame, a countershaft passing through said gear drive mechanism and being journaled therein and extending outwardly therefrom transversely of said elongated vehicle frame, drive means connecting the power output shaft of said engine and said countershaft in driving relation, power transmission means selectively connecting said countershaft and said drums in driving relation, a further shaft extending outwardly from said gear drive mechanism below the top of said vehicle frame at a right angle to said countershaft, gear means within said gear drive mechanism to connect said counter shaft and said further shaft in driving relation, said drive shaft being connected to said further shaft of said gear drive mechanism, and means selectively connecting said gear drive mechanism in driving relation with said drive shaft.

2. A mobile well drilling and servicing rig as defined in claim 1, wherein said power output shaft has a sprocket mounted thereon and wherein said countershaft has a sprocket mounted thereon in aligned, driving relation with said sprocket on said power output shaft, and wherein said drive means connecting said power output shaft and said countershaft is said sprockets and a power transmission chain surrounding said sprockets in driving relation.

3. A mobile well drilling and servicing rig as defined in claim 2, wherein each of said drums has a sprocket mounted thereon, and wherein said countershaft has sprocket means mounted thereon in aligned, driving relation with the respective sprockets of said drums, and wherein said power transmission means connecting said countershaft and said drums is said sprockets and power transmission chain means surrounding said sprockets in driving relation.

References Cited in the file of this patent

UNITED STATES PATENTS

| | | |
|---|---|---|
| 2,681,205 | Bannister et al. | June 15, 1954 |
| 2,766,628 | Wilson | Oct. 16, 1956 |